US010693183B2

United States Patent
Li et al.

(10) Patent No.: US 10,693,183 B2
(45) Date of Patent: Jun. 23, 2020

(54) ETHER-BASED ELECTROLYTE FOR NA-ION BATTERY ANODE

(71) Applicant: Battelle Memorial Institute, Richland, WA (US)

(72) Inventors: Xiaolin Li, Richland, WA (US); Jun Liu, Richland, WA (US); Vincent L. Sprenkle, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 14/683,038

(22) Filed: Apr. 9, 2015

(65) Prior Publication Data

US 2016/0301097 A1    Oct. 13, 2016

(51) Int. Cl.
*H01M 10/054* (2010.01)
*H01M 10/0568* (2010.01)
*H01M 4/38* (2006.01)
*H01M 10/0569* (2010.01)
*H01M 4/587* (2010.01)
*H01M 10/052* (2010.01)
*H01M 10/05* (2010.01)

(52) U.S. Cl.
CPC ......... *H01M 10/054* (2013.01); *H01M 4/381* (2013.01); *H01M 4/382* (2013.01); *H01M 4/587* (2013.01); *H01M 10/05* (2013.01); *H01M 10/052* (2013.01); *H01M 10/0568* (2013.01); *H01M 10/0569* (2013.01); *H01M 2300/0028* (2013.01)

(58) Field of Classification Search
CPC .............................. Y02E 60/50; Y02E 60/122
See application file for complete search history.

(56) References Cited

U.S. PATENT DOCUMENTS

| 8,158,282 | B2 | 4/2012 | Zhamu et al. | |
|---|---|---|---|---|
| 2005/0084758 | A1* | 4/2005 | Yamamoto | H01M 4/13 429/231.4 |
| 2006/0088763 | A1* | 4/2006 | Li | H01M 10/0525 429/188 |
| 2011/0076572 | A1 | 3/2011 | Amine et al. | |
| 2012/0171563 | A1* | 7/2012 | Kang | H01M 10/052 429/199 |
| 2012/0208092 | A1* | 8/2012 | Ku | H01G 11/04 429/338 |
| 2012/0321963 | A1* | 12/2012 | Fujioka | H01M 10/0565 429/303 |
| 2013/0084474 | A1* | 4/2013 | Mills | H01M 4/9016 429/9 |

(Continued)

FOREIGN PATENT DOCUMENTS

CN    103123987 A    5/2013

OTHER PUBLICATIONS

"FMC's Revolutionary Stabilized Lithium Metal Power (SLMP®)," FMC Lithium Technology Seminar—Battery Japan, Mar. 2, 2011, 27 pages.

(Continued)

*Primary Examiner* — Imran Akram
(74) *Attorney, Agent, or Firm* — Klarquist Sparkman, LLP

(57) ABSTRACT

A sodium-ion battery that includes an anode comprising hard carbon and lithium; and an electrolyte composition comprising an ether solvent and a sodium salt.

19 Claims, 11 Drawing Sheets

(56) References Cited

U.S. PATENT DOCUMENTS

| | | | | |
|---|---|---|---|---|
| 2013/0095388 A1* | 4/2013 | Nakamoto | ............... | H01M 4/13 429/304 |
| 2014/0038053 A1* | 2/2014 | Endo | ................... | H01M 4/0471 429/223 |
| 2014/0178770 A1* | 6/2014 | Xu | ......................... | C25D 3/42 429/331 |
| 2014/0220438 A1* | 8/2014 | Abe | ...................... | H01M 4/137 429/213 |
| 2014/0242434 A1* | 8/2014 | Sasaki | ................... | H01M 4/133 429/94 |
| 2014/0248534 A1* | 9/2014 | Chikugo | ................. | H01M 4/13 429/212 |
| 2015/0010818 A1* | 1/2015 | An | ....................... | H01M 4/625 429/221 |
| 2015/0050557 A1 | 2/2015 | Nakayama | | |
| 2015/0064574 A1* | 3/2015 | He | ................... | H01M 10/0568 429/300 |
| 2015/0099196 A1* | 4/2015 | Garsuch | .................... | C25B 1/14 429/405 |
| 2015/0147662 A1* | 5/2015 | Park | .................. | H01M 10/0568 429/332 |
| 2015/0263350 A1* | 9/2015 | Kang | .................... | H01M 4/622 429/217 |
| 2016/0126589 A1* | 5/2016 | Xiao | .................... | H01M 10/056 429/50 |
| 2016/0141580 A1* | 5/2016 | Sommer | ............... | H01M 2/145 429/144 |
| 2016/0240840 A1* | 8/2016 | He | .................... | H01M 10/0525 |
| 2016/0294000 A1* | 10/2016 | He | .................... | H01M 10/0525 |

OTHER PUBLICATIONS

Terada et al., "Room Temperature Sodium-Sulfur Batteries with Glyme-Na Salt Solvate Ionic Liquid Electrolytes," The 17$^{th}$ International Meeting on Lithium Batteries, IMLB, Como Itally, Jun. 10-14, 2014.

* cited by examiner

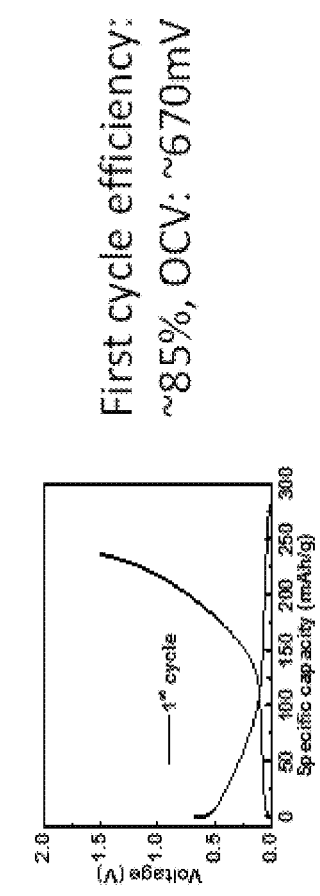
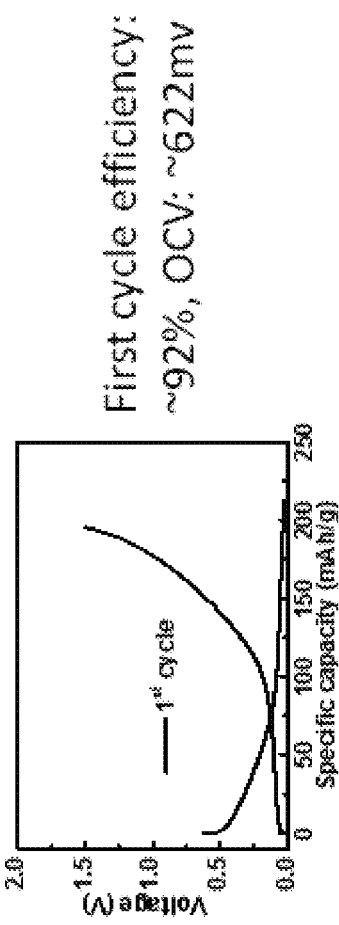
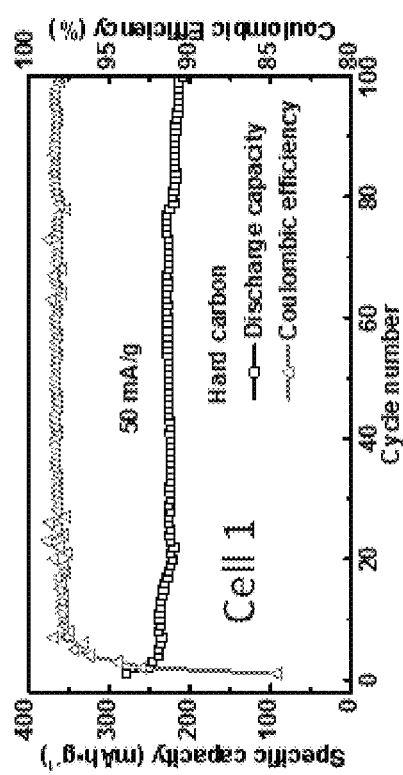
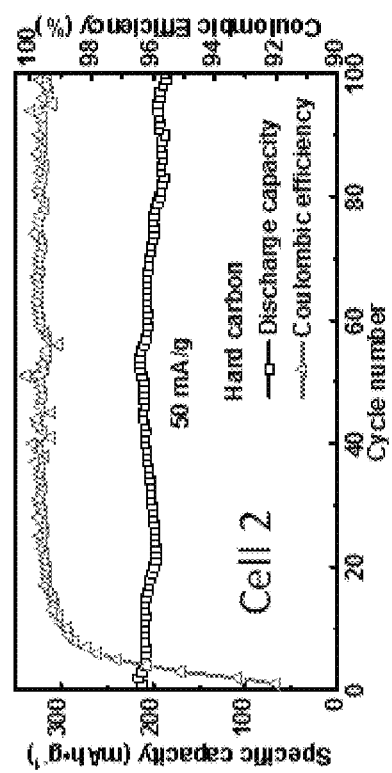
FIG. 6a
FIG. 6b
FIG. 6c
FIG. 6d

ETHER-BASED ELECTROLYTE FOR NA-ION BATTERY ANODE

ACKNOWLEDGEMENT OF GOVERNMENT SUPPORT

This invention was made with Government support under Contract DE-AC05-76RL01830 awarded by the U.S. Department of Energy. The Government has certain rights in the invention.

BACKGROUND

Disclosed herein are sodium-ion batteries.

SUMMARY

Disclosed herein is a sodium-ion battery comprising:
an anode comprising hard carbon and lithium; and
an electrolyte composition comprising an ether solvent and a sodium salt.

The foregoing will become more apparent from the following detailed description, which proceeds with reference to the accompanying figures.

BRIEF DESCRIPTION OF THE DRAWINGS

FIG. 1C is the efficiency data from cell 1.

FIGS. 2a and 2d is one pair data (cycling stability and first cycle charge-discharge curve). FIGS. 2b and 2e is another pair. FIGS. 2c and 2f is the third pair. These results show how to control the first cycle coulombic efficiency (81% to 88% to 93%) by controlling the OCV, which is controlled thorough controlling the amount of lithium powder. FIGS. 3a-3f are tested under different rates.

FIGS. 4a-4d was tested under the same rate of ~50 mA/g. FIG. 5 was tested under a different rate.

FIGS. 6a-6d and 7a-7f show the results of an inventive sodium-ion battery having a hard carbon anode with prelithiation and in an ether electrolyte (TEGDME). Cells 1, 2, 3, 4, 5 and 6 are parallel cells. FIGS. 6a and 6b are a pair, cycling stability and charge-discharge curve of the same cell. FIGS. 6c and 6d is another pair, cycling stability and charge-discharge curve of the same cell. These results show that the first cycle coulombic efficiency (85%, 92%) can be controlled by controlling the OCV which is controlled by controlling the lithium powder amount. The cells in FIGS. 7a-7f are parallel cells tested under different rate. The fluctuation is because of temperature fluctuation. The cells are stable.

DETAILED DESCRIPTION

Figure 1A:
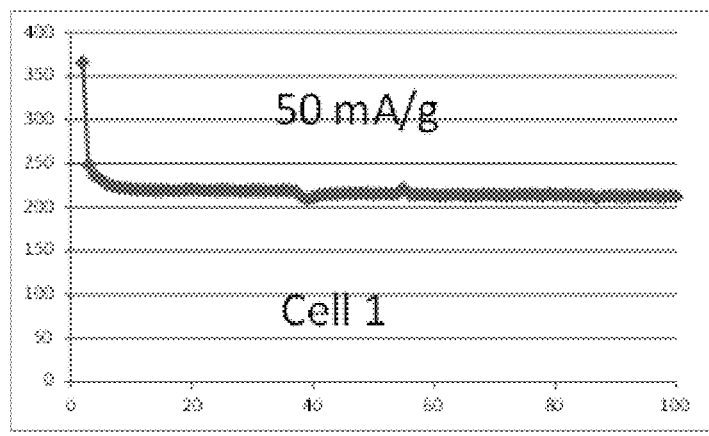
FIGS. 1a-1c show the results of a comparative sodium-ion battery having a hard carbon anode without prelithiation and in a carbonate electrolyte. Cell 1 and Cell 2 were parallel cells tested under different conditions. Cell 1 was tested under the same rate, low rate of 50 mA/g for 100 cycles; cell 2 was tested under different rates.

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought as known by those persons of ordinary skill in the art or limits of detection under standard test conditions/methods, as known to those persons of ordinary skill in the art. When directly and explicitly distinguishing embodiments from discussed prior art, the embodiment numbers are not approximates unless the word "about" is recited.

To facilitate review of the various embodiments of the disclosure, the following explanations of specific terms are provided:

Anode: An electrode through which electric charge flows into a polarized electrical device. From an electrochemical point of view, negatively-charged anions move toward the anode and/or positively-charged cations move away from it to balance the electrons arriving from external circuitry. In a discharging battery, such as the disclosed sodium-ion batteries, the anode is the negative terminal where electrons flow out. If the anode is composed of a metal, electrons that it gives up to the external circuit are accompanied by metal cations moving away from the electrode and into the electrolyte.

Anode active material: A material that is included in an anode and produces the electrons that flow out of the anode in a discharging battery.

Cell: As used herein, a cell refers to an electrochemical device used for generating a voltage or current from a chemical reaction, or the reverse in which a chemical reaction is induced by a current. Examples include voltaic cells, electrolytic cells, redox flow cells, and fuel cells, among others. A battery includes one or more cells. The terms "cell" and "battery" are used interchangeably only when referring to a battery containing a single cell.

Coin cell: A small, typically circular-shaped battery. Coin cells are characterized by their diameter and thickness. For example, a type 2325 coin cell has a diameter of 23 mm and a height of 2.5 mm.

An electrolyte composition: is a substance containing free ions that behaves as an electrically conductive medium. Electrolytes generally comprise ions in a solution, but molten electrolytes and solid electrolytes also are known.

"Hard carbon" refers to a non-graphitizable carbon material. At elevated temperatures (e.g., >1500° C.) a hard carbon remains substantially amorphous, whereas a "soft" carbon will undergo crystallization and become graphitic.

Intercalation: A term referring to the insertion of a material (e.g., an ion, molecule, or group) between the atoms, molecules, or groups of another material. For example, sodium ions can insert, or intercalate, into hard carbon.

Specific capacity: A term that refers to capacity per unit of mass. Specific capacity may be expressed in units of mAh/g, and often is expressed as mAh/g carbon when referring to a carbon-based electrode.

Sodium batteries, such as sodium-ion batteries, typically comprise two components that participate in electrochemical reactions to produce energy: an anode and a cathode. Sodium-ion batteries produce energy through electrochemical reactions occurring between the anode and cathode. Typically both the anode and cathode are made of materials into which, and from which, sodium ions can intercalate and de-intercalate. During battery discharge, sodium ions de-intercalate from the anode material and migrate to the cathode into which they insert. During a charging cycle, the opposite reaction occurs, i.e., sodium ions are extracted from the cathode material and migrate back to the anode where they reinsert.

The prelithiation of the hard carbon in combination with the ether electrolyte component synergistically improves first cycle Coulombic efficiency, specific capacity and cycling stability. The sodium-ion batteries disclosed herein exhibit high first cycle Coulombic efficiency, high specific capacity and good cycling stability. For example, in certain embodiments the batteries may have a first cycle Coulombic efficiency of at least 80%, preferably at least 90%.

The anode comprises hard carbon and lithium, and is adapted for sodium ion intercalation. In certain embodiments, the hard carbon and lithium are brought into contact with each other to form an anode. In other words, the anode is "prelithiated." The lithium may be provided in the form of lithium metal, lithium powder, lithium strips or organic lithium compounds such as lithium-biphenyl (which may be a solution of Li-biphenyl, wherein the solvent can be DME, THF etc.). Preferably, the lithium is in the form of Li metal powder such as Stabilized Lithium Metal Powder (SLMP®) available from FMC Lithium.

In certain embodiments, the lithium is contacted with a pre-formed hard carbon anode. For example, lithium powder (which may be provided as a dry powder, or as a slurry or suspension) may be applied to the surface of a pre-formed hard carbon anode. In another embodiment, the lithium may be incorporated as an initial ingredient in the anode formation process, for example in a slurry mix when the anode is being cast. In the latter embodiments, the anode binder and solvent must be compatible with the lithium.

The hard carbon is the majority component of the anode. For example, in certain embodiments that hard carbon constitutes greater than 50 weight percent, preferably greater than 80 weight percent, more preferably greater than 90 weight percent, and most preferably greater than 95 weight percent, based on the dry weight of the lithium and hard carbon combined.

The amount of lithium added to the hard carbon may vary depending upon the desired battery performance. For example, the amount of lithium may range from a low of 0.01, 0.02, or 1 to a high of 50 or 20, mg lithium/mg hard carbon.

The anode may include a binder such as, for example, polyvinylidene fluoride, styrene-butadiene rubber, polytetrafluoroethylene, carboxymethyl cellulose, polyacrylic acid, or a mixture thereof. The anode may be fabricated using a solvent such as, for example, N-methyl-2-pyrrolidone, dimethylacetamide, dimethylformamide, xylene, water or a mixture thereof.

The electrolyte composition is a non-aqueous, liquid electrolyte composition that includes a sodium salt and an ether solvent. The ether solvent may dissolve the sodium salt. Illustrative sodium salts include inorganic sodium salts such as $NaPF_6$, $NaBF_4$, $NaClO_4$ and $NaAsF_6$, and organic sodium salts such as $NaCF_3SO_3$, $NaN(CF_3SO_2)_2$, $NaN(C_2F_5SO_2)_2$, $NaN(FSO_2)_2$, $NaC(CF_3SO_2)_3$, $NaC_2F_6NO_4S_2$ (i.e., NaTFSI), and sodium bis(fluorosulfonyl) imide (i.e., NaFSI). The concentration of the sodium salt in the electrolyte composition may vary. For example, the concentration may be from 0.1 to 10, more particularly 0.5 to 5, M.

Illustrative ether solvents include dimethoxyethane (i.e., DME; glyme), bis(2-methoxyethyl)ether (i.e., diglyme, 2G), triethylene glycol dimethyl ether (i.e., triglyme, 3G), tetraethylene glycol dimethyl ether (i.e., TEGDME, 4G), and polyethyl glycol dimethyl ether (i.e., PEGDME) (PEGDME is available at different average molecular weights such as 250, 500, 1000 and 2000). In certain embodiments, the ether solvent may have up to 20 glyme (G) units. In certain embodiments, the electrolyte composition is carbonate solvent-free.

Other additives that could be included in the electrolyte composition include crown ethers or branched ethers.

The cathode includes a positive electrode active material, particularly sodium. Illustrative materials include $Na_{0.44}MnO_2$, $NaCrO_2$, $NaCoO_2$, $NaVO_2$, $NaFePO_4$, $Na_3V_2(PO_4)_3$, $Na_3V_2(PO_4)_2F_3$, $V_2O_5$, $NaNi_{1/2}Mn_{1/2}O_2$, $Na(Ni_{1/3}Co_{1/3}Mn_{1/3})O_2$, $NaLi_{0.2}Ni_{0.25}Mn_{0.75}O_y$, $Na(Ni_{1/3}Fe_{1/3}Mn_{1/3})O_2$, $P2\text{-}Na_{2/3}[Fe_{1/2}Mn_{1/2}]O_2$, $Na_2Mn^{II}[Mn^{II}(CN)_6]$, and $R\text{---}Na_{1.92}Fe[Fe(CN)_6]$, and organic cathode materials.

The cathode may include a binder such as, for example, polyvinylidene fluoride, styrene-butadiene rubber, polytetrafluoroethylene, carboxymethyl cellulose, polyacrylic acid, or a mixture thereof. The anode may be fabricated using a solvent such as, for example, N-methyl-2-pyrrolidone, dimethylacetamide, dimethylformamide, xylene, water or a mixture thereof.

Typically, the sodium-ion battery further includes a cathode collector that collects current from the cathode and an anode collector that collects current the anode. Examples of material for the cathode collector include stainless steel (SUS), aluminum (Al), nickel (Ni), iron (Fe), titanium, carbon and the like. Examples of material for the anode collector include stainless steel (SUS), copper (Cu), nickel (Ni), carbon and the like. The collector may be, for instance, in the form of a foil or a mesh, or may be porous.

The sodium-ion battery may also include a separator between the cathode and the anode. Illustrative material for the separator may be an organic material or an inorganic material. Specific examples include porous membranes of polyethylene (PE), polypropylene (PP), cellulose or polyvinylidene fluoride (PVDF) and nonwoven fabrics such as resin nonwoven fabrics and glass-fiber nonwoven fabrics. The separator may have single-layer structure (for instance, of PE or PP) or a multilayer structure (for instance, PP/PE/PP). The battery case of an ordinary battery can be used herein as the battery case. Examples of battery cases include battery cases made of SUS

EXAMPLES

Pre-lithiated hard carbon anodes were prepared as described below.

First, an appropriate amount of SLMP (e.g., 1 g) was added to an appropriate amount of anhydrous p-xylene (e.g., 30 g) in a bottle. A lid was screwed onto the bottle and then the bottle was shaken to disperse the lithium powder. The powders disperse into the xylene but gradually come out of solution once shaking has stopped. Prior to syringing, the bottle was shaken for a few minutes.

Then, the lithium concentration was roughly estimated. A petri dish was weighed and then 10 to 20 drops of the above-described SLMP suspension was added onto the dish with a pipette. The dish was weighed again after drying the xylene. The average amount of lithium powder in one droplet was then estimated.

The hard carbon electrode destined for prelithiation was then weighed. The amount of lithium powder needed to get the desired first cycle efficiency from the hard carbon weight, first cycle efficiency without prelithiation, was estimated.

For example, to improve the first cycle efficiency from 70% to 90% for 1 mg hard carbon the following was taken into account:
Assume the theoretical capacity is 250 mAh/g.
Coulombs in 1 mole (one charge per Li/Na): 9.65E4
Coulombs in 1 mAh: 3.6
Then the amount of lithium needed is calculated as below:

$$[250 \text{ mAh/g} * (1 \text{ mg}) * (90\% - 70\%)]/(9.65 * 10^4/3.6) * 7 \text{ (g/mol)} = 0.013 \text{ mg}$$

The above is a theoretical estimation/calculation. Practically, the amount needs to be further tuned or optimized by controlling the open circuit voltage. In the case with 1M $NaClO_4$ in TEGDME, the OCV should be ~0.5 to 0.8 V to get good first cycle coulombic efficiency.

The hard carbon electrode was first weighed to calculate the loading of hard carbon. The appropriate amount of Li powder was added to the surface of hard carbon electrode. It was done by using a pipette to apply the required number of drops to the surface of the anode. The number of drops or lithium amount required was calculated using the methods described above. Once drops have been injected onto the anode surface, the bulk of xylene was allowed to evaporate in the glovebox. The electrodes were placed in a vacuum oven for a minimum of 40 minutes, to allow removal of residual xylene. Then Li powder was spread onto the electrode surface via hand-pressing or rolling using a stainless steel rod to fix it to the electrode surface. A certain pressure was needed during the pressing or rolling. The prelithiation can also be done outside the glovebox in fumehood in dry room. Vacuum oven can be used to help remove xylene.

Half-cells were made with a non-prelithiated hard carbon anode or the above-described prelithiated hard carbon anode, a Na metal cathode and various electrolyte compositions.

Comparative Example 1

Figure 1B:
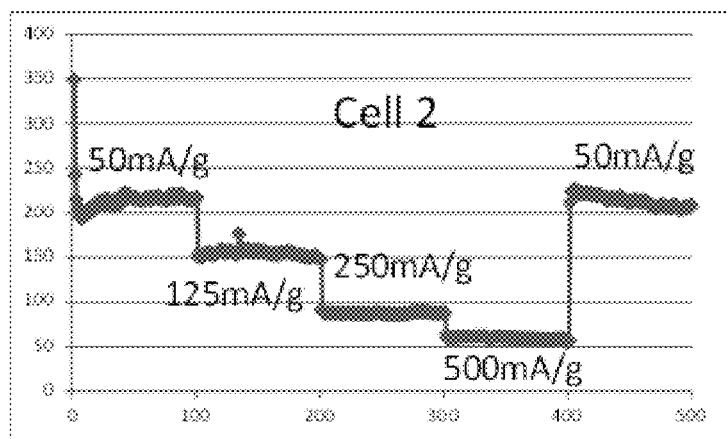
Figure 1C:
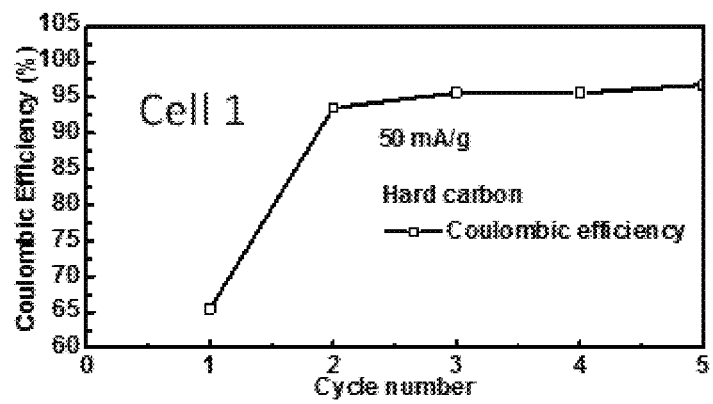
Figure 2A:
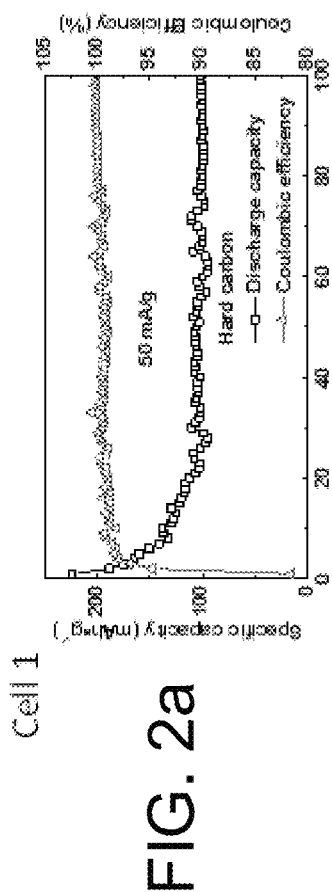
FIGS. 2a-2f and 3a-3f show the results of a comparative sodium-ion battery having a hard carbon anode with prelithiation and in a carbonate electrolyte. Cells 1-6 are parallel cells demonstrating reliable and repeatable results.
Figure 2B:
Figure 2C:
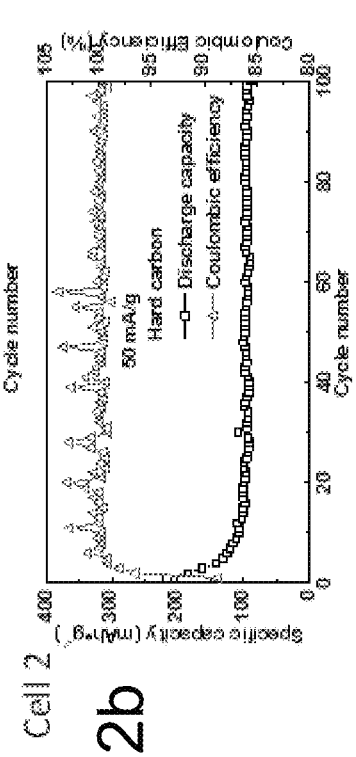
Figure 2D:
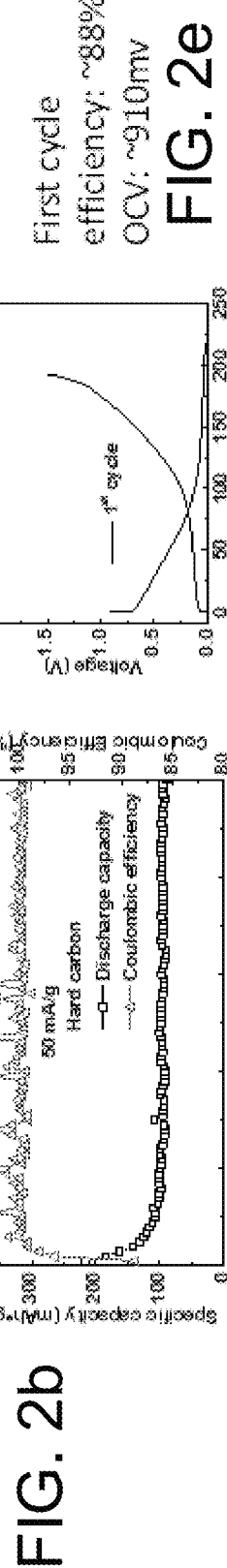
Figure 2E:
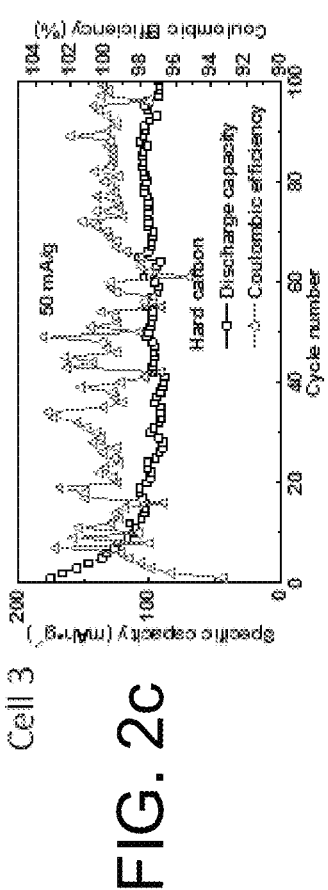
Figure 2F:
Figure 3A:
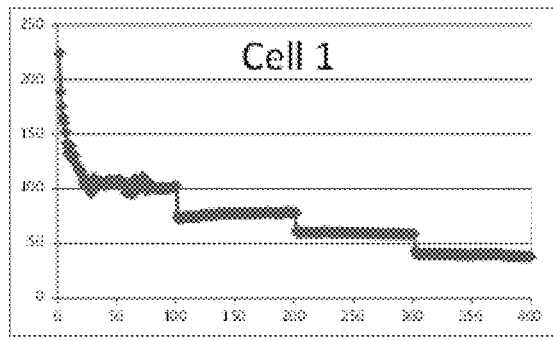
Figure 3D:
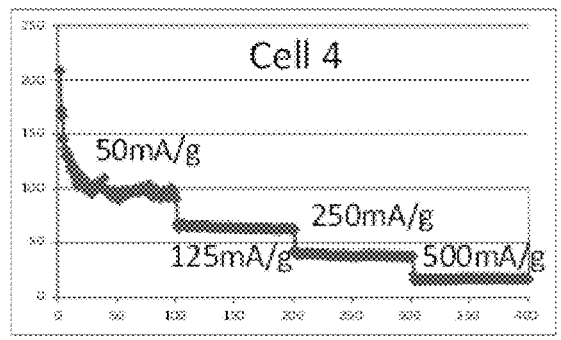
Figure 3B:
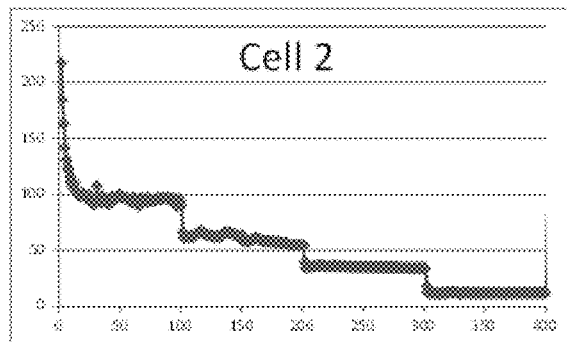
Figure 3E:
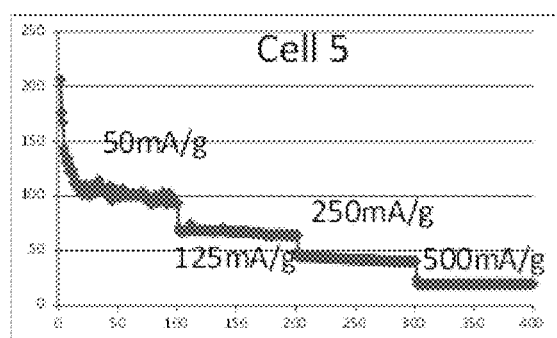
Figure 3C:
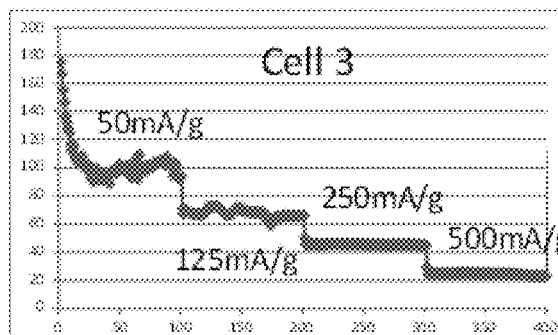
Figure 3F:
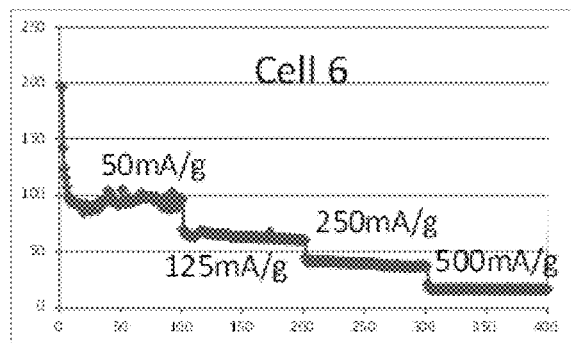
Figure 4B:
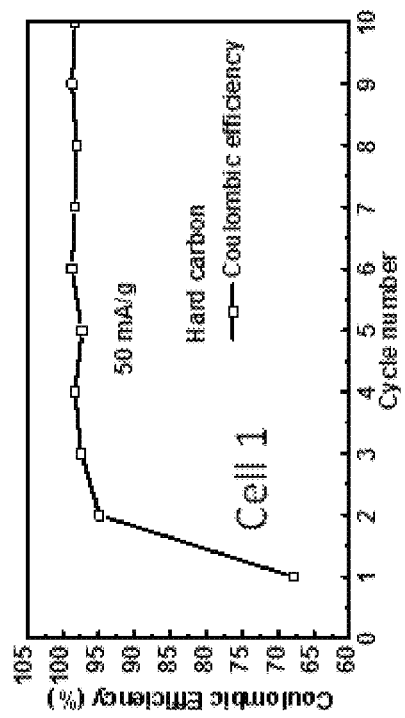
FIGS. 4a-4d and 5 show the results of a comparative sodium-ion battery having a hard carbon anode without prelithiation and in an ether electrolyte (TEGDME). Cells 1, 2, and 3 are parallel cells showing repeatable and reliable results.
Figure 4A:
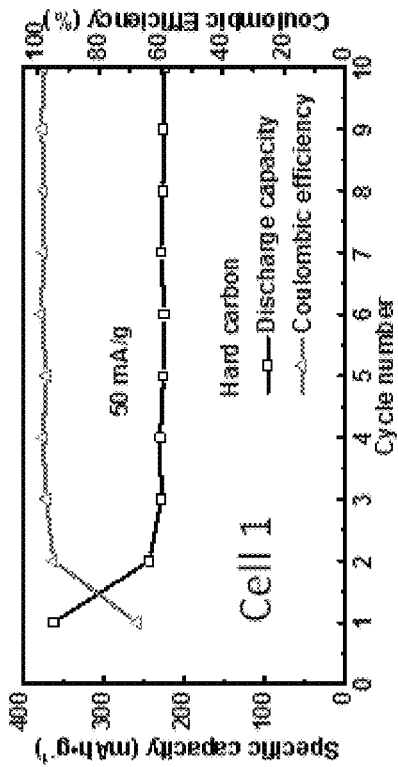
Figure 4D:
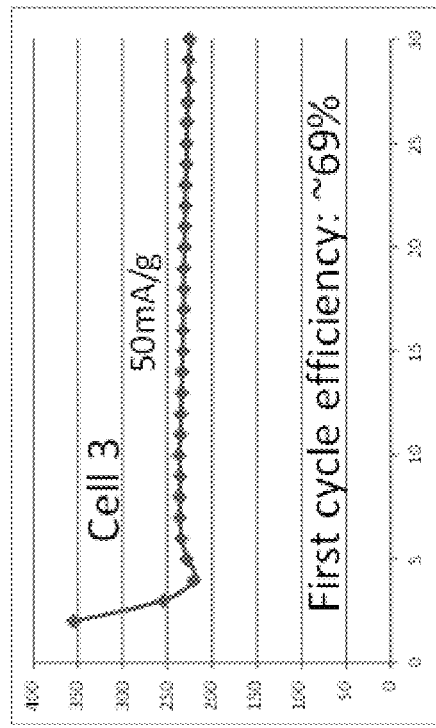
Figure 4C:
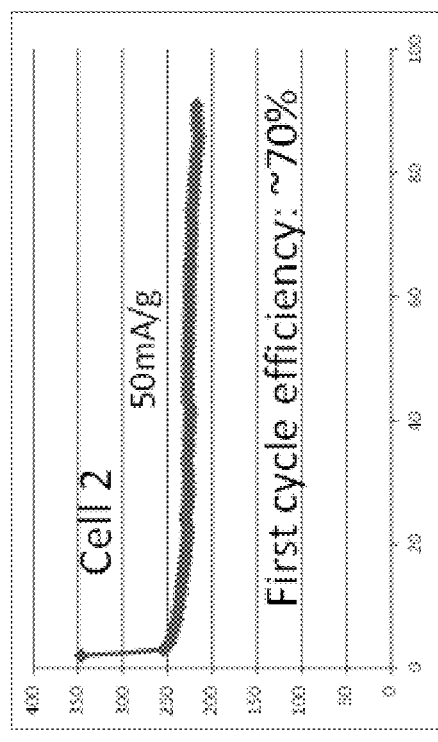
Figure 5:
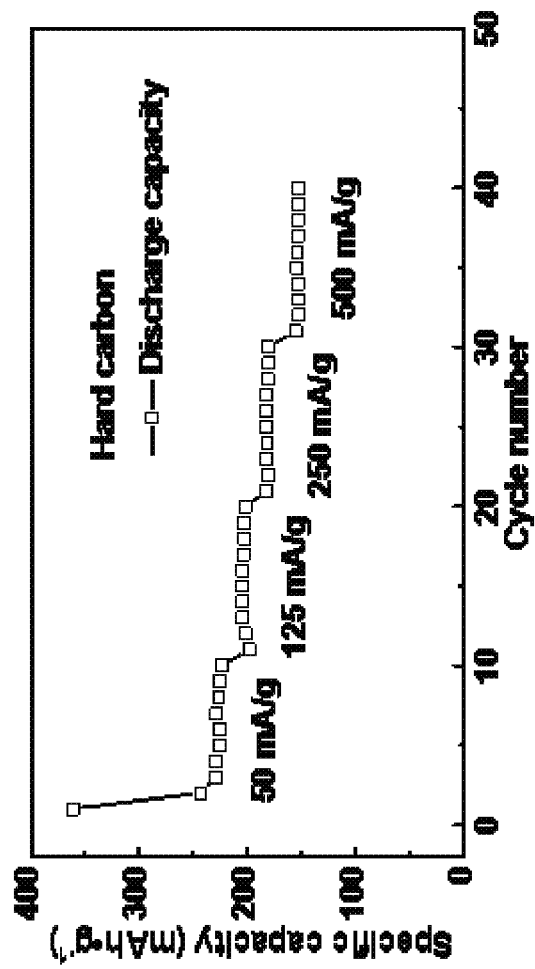
Figure 7A:
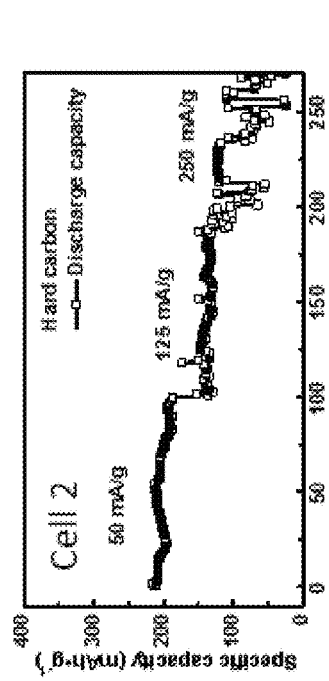
Figure 7C:
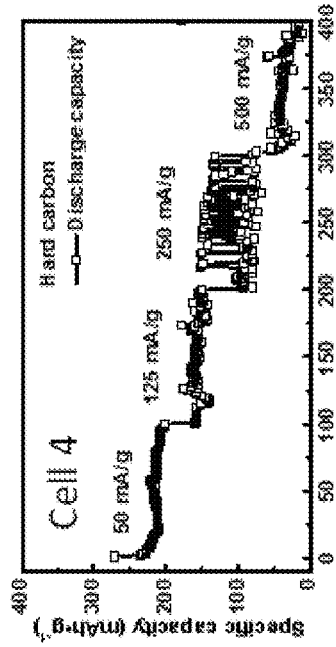
Figure 7E:
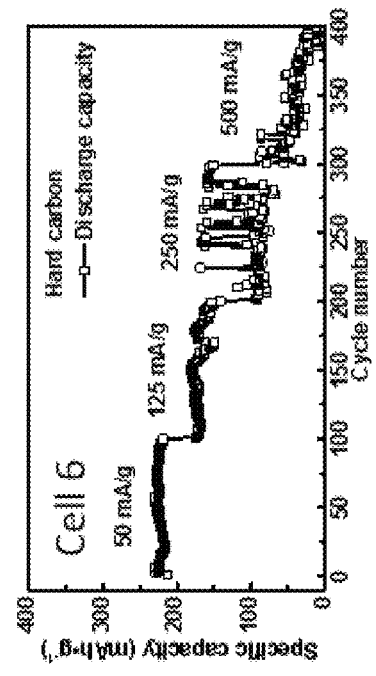
Figure 7B:
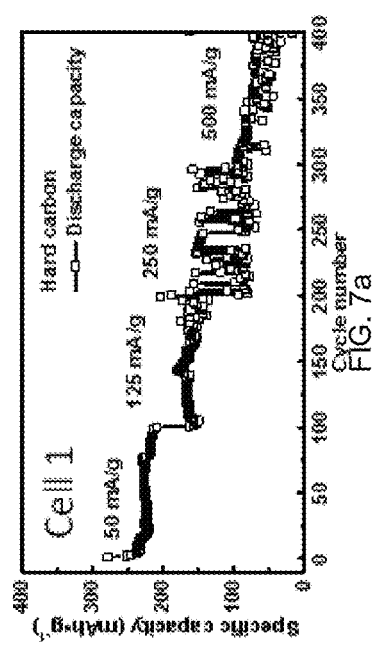
Figure 7D:
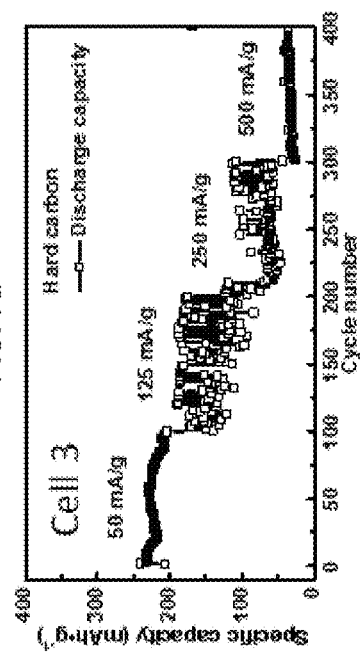
Figure 7F:
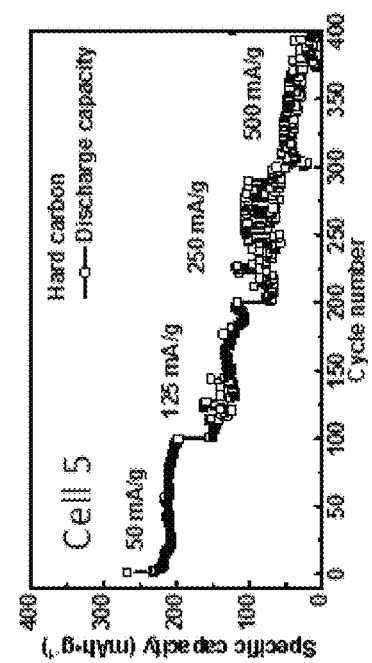
Figure 8A:
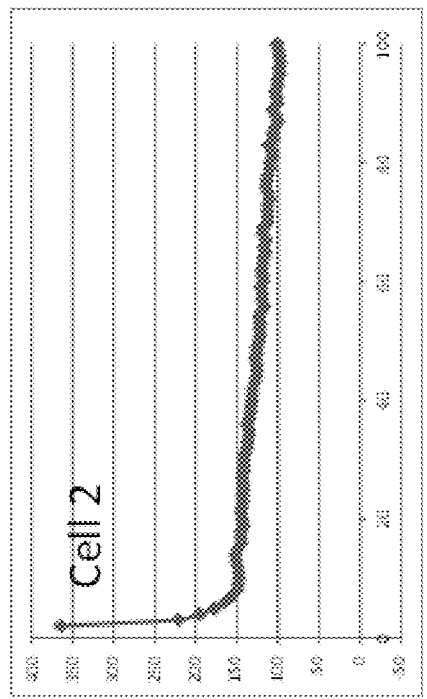
FIGS. 8a-8d show the results of a comparative sodium-ion battery having a hard carbon anode without prelithiation and in an ether electrolyte (triglyme). Cells 1, 2, 3 and 4 are parallel cells.
Figure 8B:
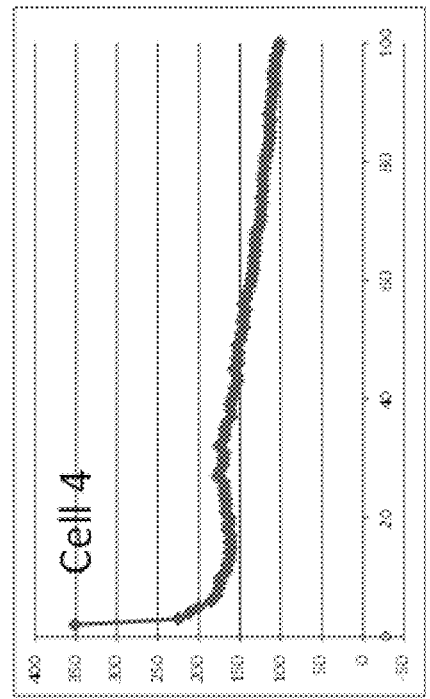
Figure 8C:
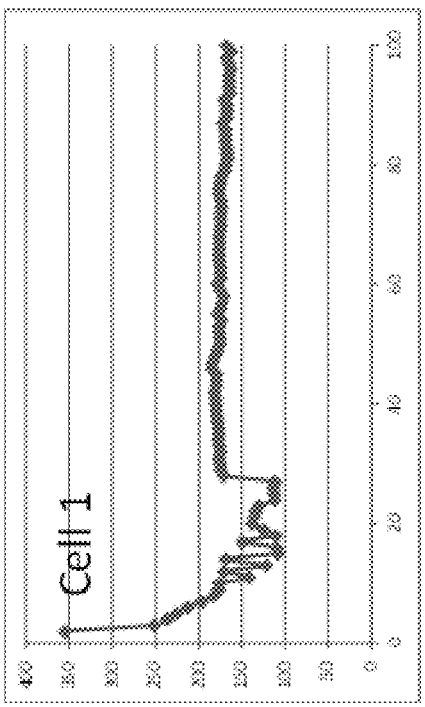
Figure 8D:
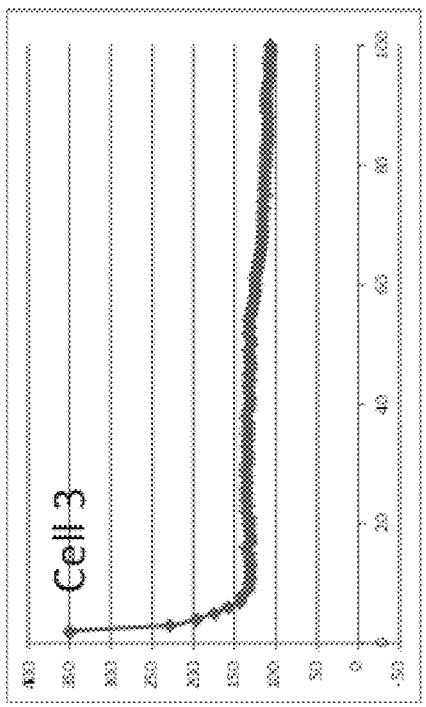

FIGS. 1a-1c show the results of a comparative sodium-ion half-cell having a hard carbon anode without prelithiation and in a carbonate electrolyte (specifically 1M $NaClO_4$ in EC/DMC)). The half-cell was subjected to the following conditions: Between 0.02 V to 1.5V; 50 mA/g current density (~0.2 C); 1 C=250 mA/g. In cell 1 the first cycle Coulombic efficient was approximately 65%, and the capacity stabilized at approximately 210 mAh/g at 0.2 C. In cell 2 the first cycle Coulombic efficient was approximately 65%, and the capacity stabilized at approximately 210 mAh/g at 0.2 C. Cell 2 had a reasonable rate performance, the capacity was low at a high rate, and the capacity is approximately 100 mAh/g at 1 C.

Comparative Example 2

FIGS. 2a-2f and 3a-3f show the results of a comparative sodium-ion battery having a hard carbon anode with prelithiation and in a carbonate electrolyte (specifically 1M $NaClO_4$ in EC/DMC)). The half-cell was subjected to the following conditions: Between 0.02 V to 1.5V; 50 mA/g current density (~0.2 C); 1 C=250 mA/g. The capacity was low and stabilized at approximately 100 mAh/g at 0.2 C, and the rate performance was poor.

Comparative Example 3

FIGS. 4a-4d and 5 show the results of a comparative sodium-ion battery having a hard carbon anode without prelithiation and in an ether electrolyte (TEGDME) (specifically 1M $NaClO_4$ in TEGDME). The half-cell was subjected to the following conditions: Between 0.02 V to 1.5V; 50 mA/g current density (~0.2 C); 1 C=250 mA/g. The capacity stabilized at approximately 200 mAh/g at 0.2 C, the half-cell exhibited good rate performance at a capacity of approximately 180 mAh/g at 1 C.

Inventive Example 4

FIGS. 6a-6d and 7a-7f show the results of an inventive sodium-ion battery having a hard carbon anode with prelithiation and in an ether electrolyte (TEGDME) (specifically 1M $NaClO_4$ in TEGDME). The half-cell was subjected to the following conditions: Between 0.02 V to 1.5V; 50 mA/g current density (~0.2 C); 1 C=250 mA/g. The capacity stabilized at approximately 200 mAh/g at 0.2 C, and the half-cell exhibited good rate performance at a capacity of approximately 120 mAh/g at 1 C (estimated value since there was a severe temperature effect). There was a high first cycle Coulombic efficiency close to 100%.

Comparative Example 5

FIGS. 8a-8d show the results of a comparative sodium-ion battery having a hard carbon anode without prelithiation and in an ether electrolyte (triglyme) (specifically 1M $NaClO_4$ in triglyme). The half-cell was subjected to the following conditions: Between 0.02 V to 1.5V; 50 mA/g current density (~0.2 C); 1 C=250 mA/g. The first cycle Coulombic efficiency of hard carbon in 3G is similar to that in TEGDME, but the capacity is low at approximately 120 mAh/g at 0.2 C.

Inventive Example 6

Figure 9B:
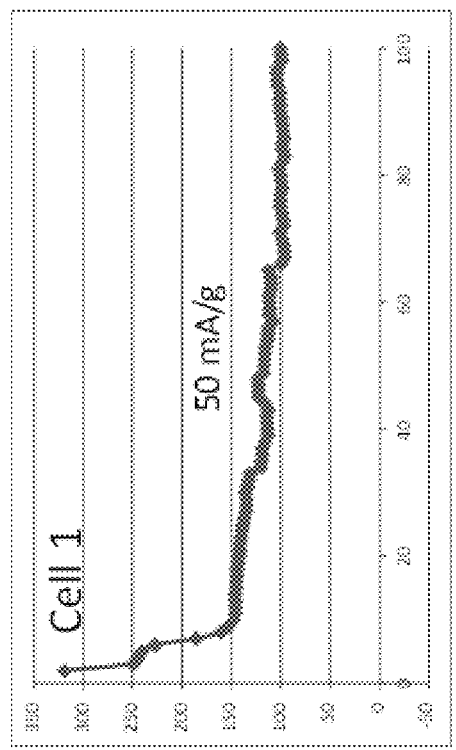
FIGS. 9a-9b shows the results of an inventive sodium-ion battery having a hard carbon anode with prelithiation and in an ether electrolyte (triglyme). Cells 1 and 2 are parallel cells.
Figure 9A:
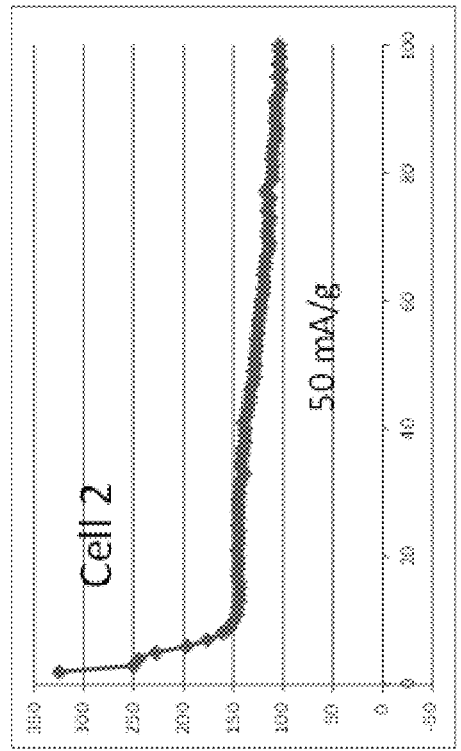
Figure 10B:
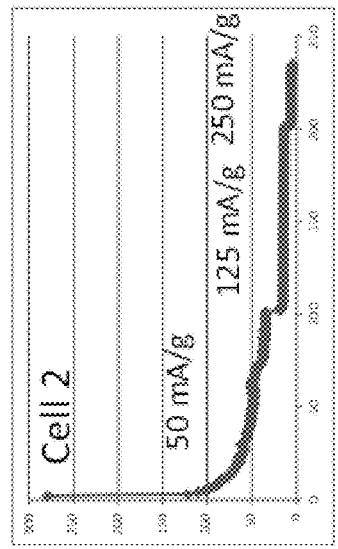
FIGS. 10a-10f show the results of a comparative sodium-ion battery having a hard carbon anode without prelithiation and in an ether electrolyte (diglyme). Cells 1, 2, 3, 4, 5 and 6 are parallel cells.
Figure 10D:
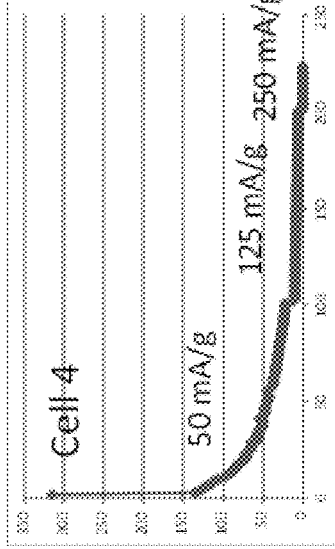
Figure 10F:
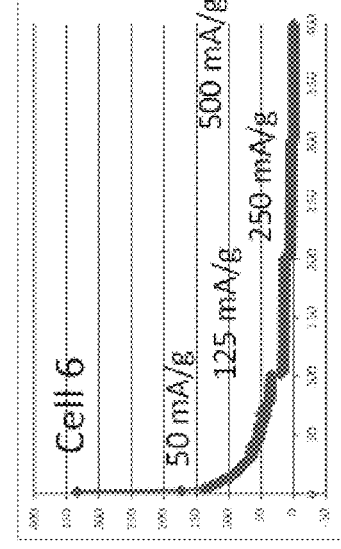
Figure 10A:
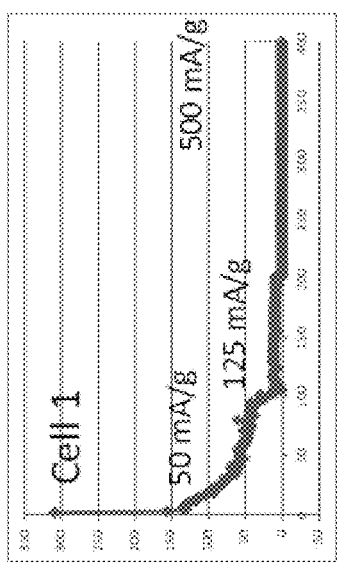
Figure 10C:
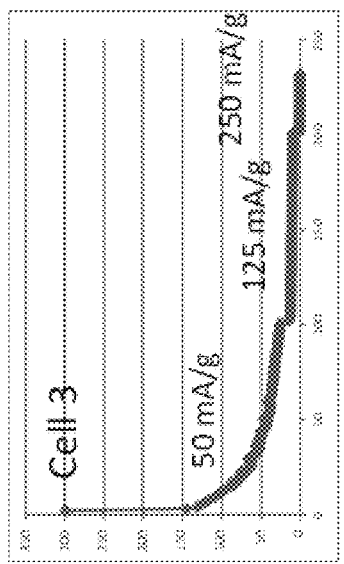
Figure 10E:
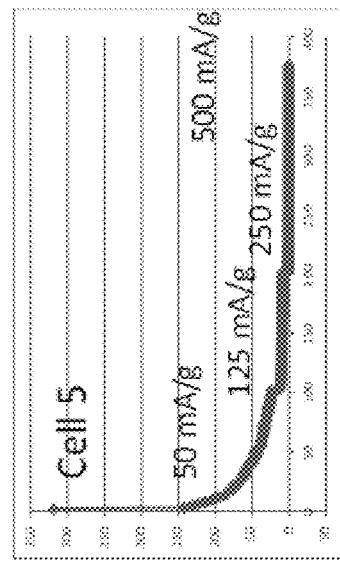
Figure 11B:
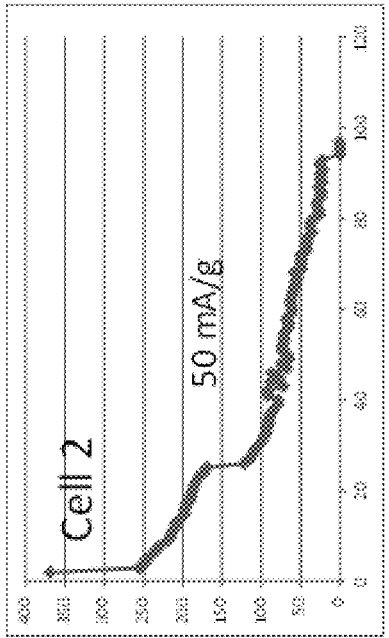
FIGS. 11a-11d show the results of a comparative sodium-ion battery having a hard carbon anode without prelithiation and in an ether electrolyte (DME). Cells 1, 2, 3 and 4 are parallel cells.
Figure 11D:
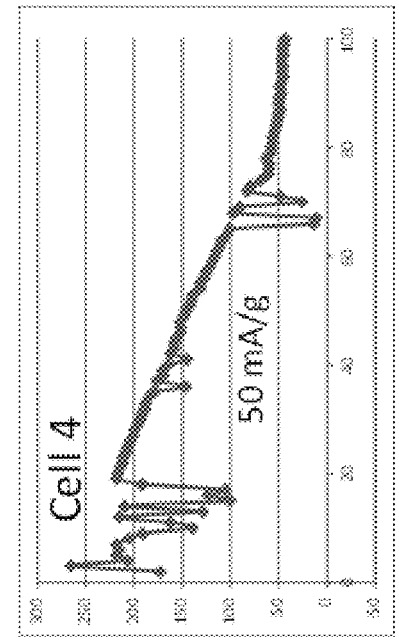
Figure 11A:
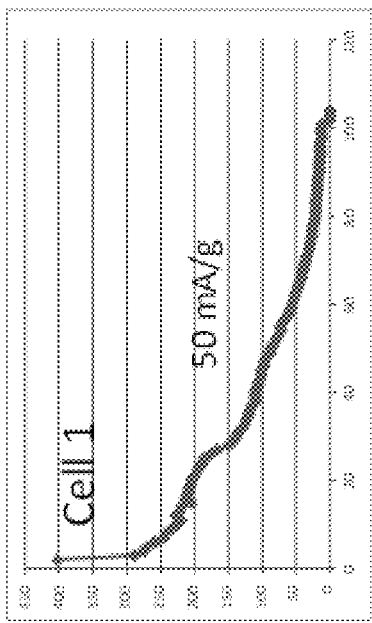
Figure 11C:
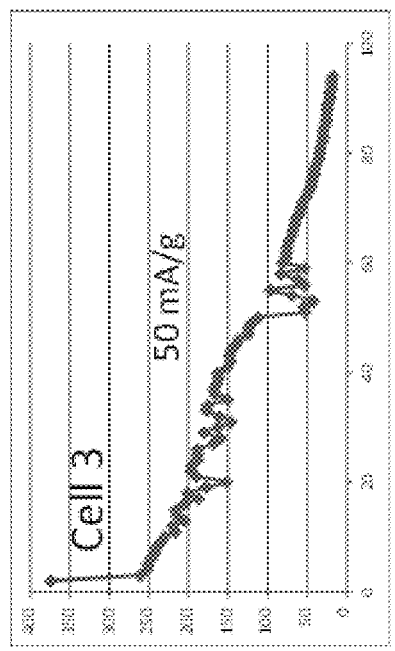

FIGS. 9a-9b shows the results of an inventive sodium-ion battery having a hard carbon anode with prelithiation and in an ether electrolyte (triglyme) (specifically 1M $NaClO_4$ in triglyme). The half-cell was subjected to the following conditions: Between 0.02 V to 1.5V; 50 mA/g current density (~0.2 C); 1 C=250 mA/g. The capacity is low at approximately 120 mAh/g at 0.2 C.

Comparative Example 7

FIGS. 10a-10f show the results of a comparative sodium-ion battery having a hard carbon anode without prelithiation and in an ether electrolyte (diglyme) (specifically 1M $NaClO_4$ in diglyme). The half-cell was subjected to the following conditions: Between 0.02 V to 1.5V; 50 mA/g current density (~0.2 C); 1 C=250 mA/g. The capacity faded quickly.

Comparative Example 8

FIGS. 11a-11d show the results of a comparative sodium-ion battery having a hard carbon anode without prelithiation and in an ether electrolyte (DME) (specifically 1M $NaClO_4$ in DME). The half-cell was subjected to the following conditions: Between 0.02 V to 1.5V; 50 mA/g current density (~0.2 C); 1 C=250 mA/g. The capacity faded quickly, and was unpredictable. The batteries usually experienced sudden death.

In view of the many possible embodiments to which the principles of the disclosed invention may be applied, it should be recognized that the illustrated embodiments are only preferred examples of the invention and should not be taken as limiting the scope of the invention.

What is claimed is:

1. A device comprising:
    an anode comprising hard carbon and lithium metal powder, wherein the lithium metal powder is present in the anode in an amount of 0.01 to 20 mg lithium/mg hard carbon and the hard carbon is present in the anode in an amount of greater than 50 weight percent, based on the total dry weight of the hard carbon and lithium metal powder combined; and wherein sodium ions can intercalate into, and de-intercalate from, the anode;
    a cathode wherein sodium ions can intercalate into, and de-intercalate from, the cathode; and
    an electrolyte composition comprising an ether solvent and a sodium salt, wherein the ether solvent is selected from triethylene glycol dimethyl ether, tetraethylene glycol dimethyl ether, polyethyl glycol dimethyl ether, or a mixture thereof,
    wherein the anode, the cathode and the electrolyte composition are configured as a sodium-ion battery.

2. The device of claim 1, wherein the ether solvent is tetraethylene glycol dimethyl ether.

3. The device of claim 1, wherein the sodium salt is selected from $NaPF_6$, $NaBF_4$, $NaClO_4$, $NaAsF_6$, $NaCF_3SO_3$, $NaN(CF_3SO_2)_2$, $NaN(C_2F_5SO_2)_2$, $NaN(FSO_2)_2$, $NaC(CF_3SO_2)_3$, $NaC_2F_6NO_4S_2$, and sodium bis(fluorosulfonyl) imide, or a mixture thereof.

4. The device of claim 1, wherein the electrolyte composition does not include a carbonate.

5. The device of claim 1, wherein the electrolyte composition does not include a carbonate.

6. The device of claim 1, wherein the lithium is present in the anode in an amount of 0.01 to 1 mg lithium/mg hard carbon.

7. A device comprising:
    an anode comprising hard carbon and lithium metal powder, wherein the hard carbon is present in the anode in an amount of greater than 50 weight percent, based on the total dry weight of the hard carbon and lithium metal powder combined, and sodium ions can intercalate into, and de-intercalate from, the anode;
    a cathode wherein sodium ions can intercalate into, and de-intercalate from, the cathode; and
    an electrolyte composition comprising an ether solvent and a sodium salt, wherein the ether solvent is selected from triethylene glycol dimethyl ether, tetraethylene glycol dimethyl ether, polyethyl glycol dimethyl ether, or a mixture thereof,
    wherein the anode, the cathode and the electrolyte composition are configured as a sodium-ion battery.

8. The device of claim 7, wherein the ether solvent is tetraethylene glycol dimethyl ether.

9. The device of claim 7, wherein the electrolyte composition does not include a carbonate.

10. The device of claim 7, wherein the lithium is present in the anode in an amount of 0.01 to 20 mg lithium/mg hard carbon.

11. The device of claim 7, wherein the hard carbon is present in the anode in an amount of greater than 80 weight percent, based on the total dry weight of the hard carbon and lithium combined.

12. The device of claim 7, wherein the hard carbon is present in the anode in an amount of greater than 95 weight percent, based on the total dry weight of the hard carbon and lithium combined.

13. A method comprising fabricating a sodium-ion battery by
    combining a lithium metal powder with hard carbon resulting in a prelithiated anode, wherein sodium ions can intercalate into, and de-intercalate from, the anode, wherein the hard carbon is present in the anode in an amount of greater than 50 weight percent, based on the total dry weight of the hard carbon and lithium metal powder combined; and
    coupling the prelithiated anode with an electrolyte composition comprising an ether solvent and a sodium salt, wherein the ether solvent is selected from triethylene glycol dimethyl ether, tetraethylene glycol dimethyl ether, polyethyl glycol dimethyl ether, or a mixture thereof, and a cathode wherein sodium ions can intercalate into, and de-intercalate from, the cathode.

14. The method of claim 13, wherein the lithium is present in the anode in an amount of 0.01 to 20 mg lithium/mg hard carbon.

15. The method of claim 13, wherein the lithium is present in the anode in an amount of 0.01 to 1 mg lithium/mg hard carbon.

16. The method of claim 13, wherein the ether solvent is selected from dimethoxyethane, bis(2-methoxyethyl)ether, triethylene glycol dimethyl ether, tetraethylene glycol dimethyl ether, polyethyl glycol dimethyl ether, or a mixture thereof, and the sodium salt is selected from $NaPF_6$, $NaBF_4$, $NaClO_4$, $NaAsF_6$, $NaCF_3SO_3$, $NaN(CF_3SO_2)_2$, $NaN(C_2F_5SO_2)_2$, $NaN(FSO_2)_2$, $NaC(CF_3SO_2)_3$, $NaC_2F_6NO_4S_2$, and sodium bis(fluorosulfonyl) imide, or a mixture thereof.

17. A device comprising:
an anode consisting of hard carbon, lithium metal powder and a binder, wherein the hard carbon is present in the anode in an amount of greater than 50 weight percent, based on the total dry weight of the hard carbon and lithium metal powder combined and sodium ions can intercalate into, and de-intercalate from, the anode;
a cathode wherein sodium ions can intercalate into, and de-intercalate from, the cathode; and
an electrolyte composition comprising an ether solvent and a sodium salt, wherein the ether solvent is selected from triethylene glycol dimethyl ether, tetraethylene glycol dimethyl ether, polyethyl glycol dimethyl ether, or a mixture thereof,
wherein the anode, the cathode and the electrolyte composition are configured as a sodium-ion battery.

18. A method comprising fabricating a sodium-ion battery by
combining a lithium metal powder with hard carbon and a binder resulting in a prelithiated anode, wherein the hard carbon is present in the anode in an amount of greater than 50 weight percent, based on the total dry weight of the hard carbon and lithium metal powder combined, wherein sodium ions can intercalate into, and de-intercalate from, the anode; and
coupling the prelithiated anode with an electrolyte composition comprising an ether solvent and a sodium salt, wherein the ether solvent is selected from triethylene glycol dimethyl ether, tetraethylene glycol dimethyl ether, polyethyl glycol dimethyl ether, or a mixture thereof, and a cathode wherein sodium ions can intercalate into, and de-intercalate from, the cathode.

19. A device comprising:
an anode consisting of hard carbon, lithium metal powder, a binder, and a solvent, wherein the lithium metal powder is present in the anode in an amount of 0.01 to 20 mg lithium/mg hard carbon, the hard carbon is present in the anode in an amount of greater than 50 weight percent, based on the total dry weight of the hard carbon and lithium metal powder combined, and sodium ions can intercalate into, and de-intercalate from, the anode;
a cathode wherein sodium ions can intercalate into, and de-intercalate from, the cathode; and
an electrolyte composition comprising an ether solvent and a sodium salt, wherein the ether solvent is selected from triethylene glycol dimethyl ether, tetraethylene glycol dimethyl ether, polyethyl glycol dimethyl ether, or a mixture thereof,
wherein the anode, the cathode and the electrolyte composition are configured as a sodium-ion battery.

* * * * *